(12) United States Patent
Woodard, II et al.

(10) Patent No.: US 8,437,977 B1
(45) Date of Patent: May 7, 2013

(54) CONTROLLER TESTING UNIT

(75) Inventors: Richard Keith Woodard, II, Madison, AL (US); Steven J. Ferguson, Huntsville, AL (US); Grant Michael Davis, Laceys Spring, AL (US)

(73) Assignee: The Boeing Company, Chicago, IL (US)

( * ) Notice: Subject to any disclaimer, the term of this patent is extended or adjusted under 35 U.S.C. 154(b) by 609 days.

(21) Appl. No.: 12/634,969

(22) Filed: Dec. 10, 2009

(51) Int. Cl.
*G01P 21/00* (2006.01)

(52) U.S. Cl.
USPC .......................................... 702/122; 701/29.2

(58) Field of Classification Search .................. 702/122; 701/29.2, 33.4
See application file for complete search history.

(56) References Cited

U.S. PATENT DOCUMENTS

| | | | |
|---|---|---|---|
| 4,821,217 A * | 4/1989 | Jackson et al. ..................... 701/3 |
| 5,023,791 A * | 6/1991 | Herzberg et al. ............. 701/33.4 |
| 5,111,402 A * | 5/1992 | Brooks et al. ................ 701/29.2 |
| 5,541,863 A | 7/1996 | Magor et al. |
| 7,047,176 B2 | 5/2006 | Klevans et al. |
| 7,171,653 B2 | 1/2007 | Albrecht |
| 2010/0076716 A1* | 3/2010 | Quitmeyer et al. ........... 702/121 |

* cited by examiner

*Primary Examiner* — Manuel L Barbee
(74) *Attorney, Agent, or Firm* — Yee & Associates, P.C.

(57) ABSTRACT

An embodiment of the present disclosure provides a method, apparatus, and computer program product for testing hardware. A number of commands are identified for a testing unit. A communication layer of the testing unit is requested to send the number of commands to a controller unit for a platform. The testing unit is remote from the controller unit. The number of commands is coordinated with the controller unit. Results of the number of commands of the testing unit are received through the communication layer.

20 Claims, 7 Drawing Sheets

CONTROLLER TESTING UNIT

BACKGROUND INFORMATION

1. Field:

The present disclosure relates generally to aircraft and, in particular, to a method and apparatus for testing hardware units of the aircraft. Still more particularly, the present disclosure relates to a method and apparatus for testing timing requirements of software on controller units of the aircraft.

2. Background:

Aircraft may have an electrical power generating and start system. The system may generate and control the electrical power on the aircraft. The system may also provide the auxiliary power unit and main engine start capabilities. The system may also drive the cabin air compressors and electric motor pumps. The system may comprise common motor starter controllers.

The common motor starter controller may control and monitor the state of the power system. The common motor starter controller may start the auxiliary power unit and other motors of the aircraft. The common motor starter controller may also monitor voltages for spikes and then shut down that particular system if there is a spike. If any signals being monitored violate expected values, then corrective action must be taken. Monitoring is done to protect hardware of an aircraft, such as, the common motor starter controller itself, the actual motor being started, or wiring within the aircraft. If a current gets too high in the wiring, the motor or wiring may fail. Relatively tight timing requirements exist that define when the monitor should result in corrective action.

Due to the tight timing requirements, the timing requirements of the common motor starter controllers may be one area that is tested specifically. Common motor starter controllers may be tested prior to use. Testing may be done on the timing of the embedded software on the controller.

For example, given that a current exceeding 100 amperes for more than 10 milliseconds is not an acceptable spike in current, the common motor starter controller may need to cut off all current to the motor. If the current exceeds 100 amperes for only 9 milliseconds then this may be an acceptable spike. Tests may be written to verify that a spike of 99 amperes, a spike of 100 amperes for 10 milliseconds, and a spike of over 100 amperes for 9 milliseconds does not cut off the current to the motor.

The tests may be run in hardware labs with expensive test equipments to collect actual measurements. Most of the data collected with the test equipments may be manually analyzed. One timing requirement, such as the one discussed above, may require test cases. Hundreds to thousands of timing requirements may exist requiring many types of lab equipment, time, and cost.

Therefore, it would be advantageous to have a method and apparatus that takes into account one or more of the issues discussed above.

SUMMARY

An embodiment of the present disclosure provides a method for testing hardware. A number of commands are identified for a testing unit. A communication layer of the testing unit is requested to send the number of commands to a controller unit for a platform. The testing unit is remote from the controller unit. The number of commands is coordinated with the controller unit. Results of the number of commands of the testing unit are received through the communication layer.

Another embodiment of the present disclosure provides a method for testing hardware. A number of commands from a communication layer of a testing unit are received at a controller unit. The testing unit is remote from the controller unit. The number of commands is coordinated with the testing unit. Results of the number of commands of the testing unit are sent through the communication layer of the testing unit.

Yet another embodiment of the present disclosure provides an apparatus. The apparatus comprises a bus; a memory connected to the bus; and a processor unit connected to the bus. The processor unit is configured to identify a number of commands for a testing unit. The processor unit is configured to request a communication layer of the testing unit to send the number of commands to a controller unit for a platform. The testing unit is remote from the controller unit. The processor unit is configured to coordinate the number of commands with the controller unit. The processor unit is configured to receive, through the communication layer, results of the number of commands of the testing unit.

Yet another embodiment of the present disclosure provides a computer program product. The computer program product comprises a computer recordable storage medium with program code stored on the computer readable storage medium. The computer program product comprises program code, stored on the computer recordable storage medium, for identifying a number of commands for a testing unit. The computer program product comprises program code, stored on the computer recordable storage medium, for requesting a communication layer of the testing unit to send the number of commands to a controller unit for a platform. The testing unit is remote from the controller unit. The computer program product comprises program code, stored on the computer recordable storage medium, for coordinating the number of commands with the controller unit. The computer program product comprises program code, stored on the computer recordable storage medium, for receiving, through the communication layer, results of the number of commands of the testing unit.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
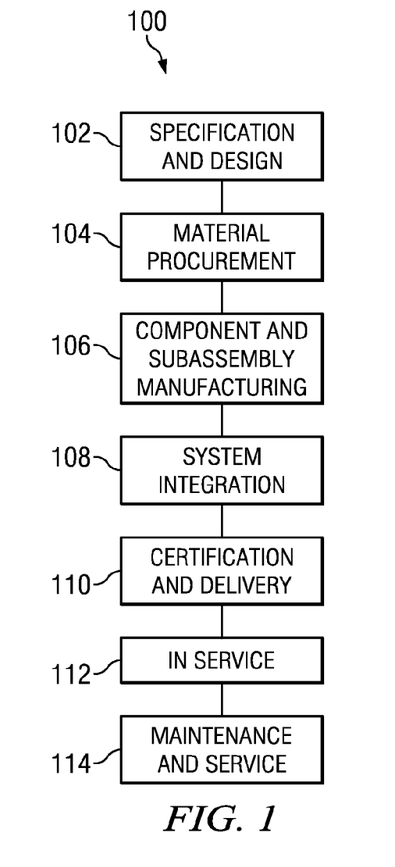
FIG. 1 is an illustration of an aircraft manufacturing and service method in accordance with an advantageous embodiment.
Figure 2:
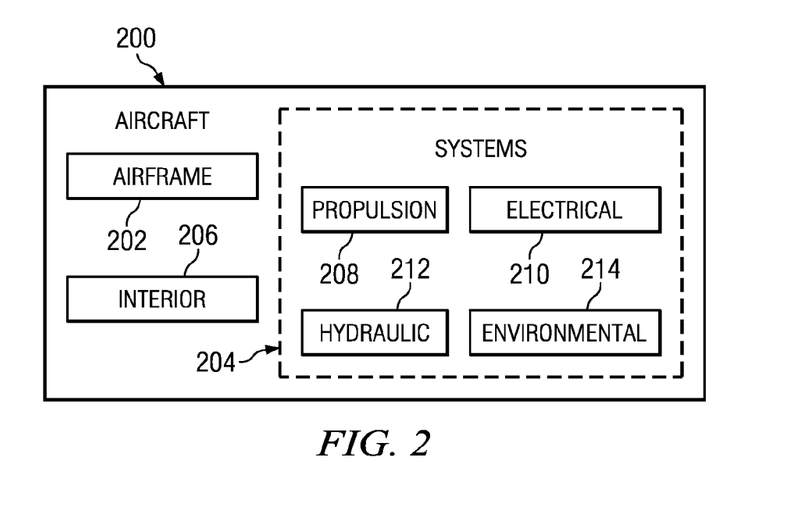
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion 208, electrical 210, hydraulic 212, and environmental 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used, and only one of each item in the list may be needed. For example, "at least one of item A, item B, and item C" may include, without limitation, item A or item A and item B. This example also may include item A, item B, and item C or item B and item C.

As one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

The different advantageous embodiments recognize and take into account a number of considerations. For example, the different advantageous embodiments recognize and take into account that one way to test the timing requirements is modifying the code on the controller and running a designed software pack for that code on the controller. For each test a different code must be run on the controller. Running many tests costs time and money due to changing out the code on the controller for each test. The embedded software is loaded onto the on-chip memory on the board modifying the application that is running on the board.

As another example, the different advantageous embodiments recognize and take into account that the embedded software may be tested in a simulated environment. In the simulated environment, hardware is not used. Instead, the embedded code is loaded onto a computer, for example, and then tested running on the testing computer and not on the hardware controller unit. However, a problem with the simulation environment approach is that the timing is different than when executed on the controller unit.

Figure 3:
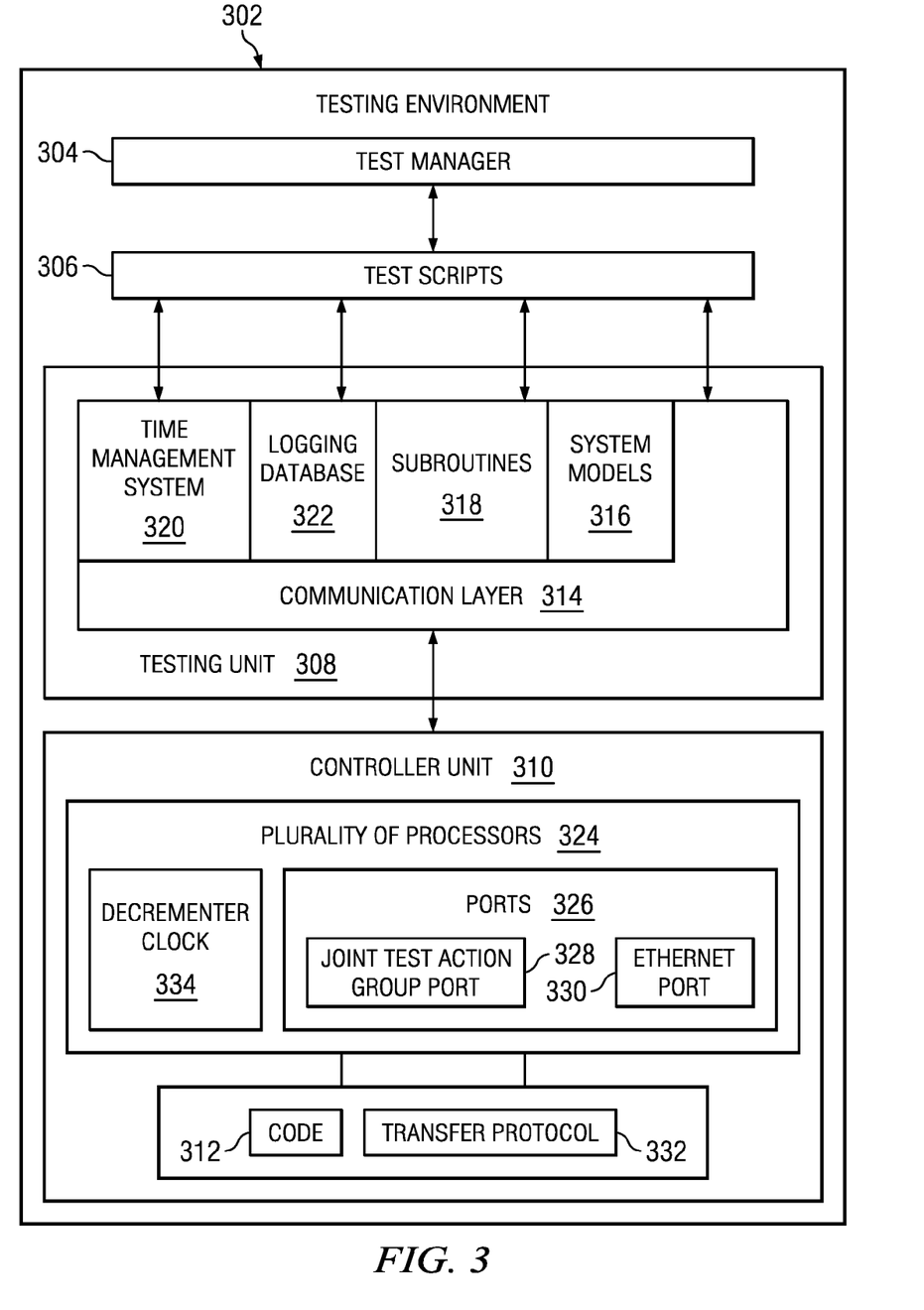
FIG. 3 is an illustration of a block diagram of a testing environment in which an advantageous embodiment may be implemented.

Turning now to FIG. 3, an illustration of a block diagram of a testing environment is depicted in accordance with an advantageous embodiment. Test environment 302 may comprise test manager 304, test scripts 306, testing unit 308, and controller unit 310. Test environment 302 may be used to test parameters of a controller unit, such as controller unit 310.

Test environment 302 may be implemented on controller units that are used in aircraft, such as aircraft 200 as shown in FIG. 2. Test environment 302 may also be used for testing of controller units used in systems 204, such as propulsion 208, of aircraft 200 as shown in FIG. 2.

Test manager 304 may be a unit testing framework for testing of different elements of software. Test manager 304 may operate and execute test scripts 306. Test manager 304 may provide an operation without a user, with no need to write the same tests many times, and no need to remember what should be the result of each test.

Test scripts 306 may be any number of programs which test the timing and/or functionality of controller unit 310. Test scripts 306 may test the timing of code 312 of controller unit 310. Test scripts 306 may test controller unit 310 by providing commands to check memory locations of controller unit 310. Test scripts 306 may be written to test other parameters of controller unit 310. There may be any number of test scripts 306. Test scripts 306 are able to be selected by test manager 304 and/or an operator. In different embodiments, test scripts 306 may be part of testing unit 308.

Testing unit 308 may be used to test timing requirements of controller unit 310. Testing unit 308 may have a communication layer 314, system models 316, subroutines 318, time management system 320, and logging database 322. In different embodiments, testing unit 308 may also comprise test scripts 306 and test manager 308.

Subroutines 318 may be functions that perform part of the computation of another function. Subroutines 318 may be used to make test scripts 306 easier to read by giving descriptive names to computations. Subroutines 318 may make a series of calls to communication layer 314 to send commands to controller unit 310. Controller unit 310 may receive the commands. The commands may pause decrementer clock 334 on the controller unit 310 and run different tasks which test the parameters of controller unit 310.

Decrementer clock 334 may also be referred to as a system clock. Decrementer clock 334 is a clock of the processor different from the oscillator crystal of a processor. Decrementer clock 334 may operate as a counting clock to execute commands. Decrementer clock 334 may be part of a PowerPC® processor. PowerPC® is a registered trademark of IBM. Decrementer clock 334 may be used to keep system time for an operating system. Decrementer clock 334 may generate an interrupt at a specified rate. In controller unit 310, decrementer clock may be configured to a 200 microsecond rate.

Controller unit 310 may execute commands from testing unit 308 while decrementer clock 334 on controller unit 310 is paused. Once the commands are executed, the results of the execution of the commands may be returned to testing unit 308 through communication layer 314. The results may be logged in a database and/or memory by logging database 322. Time management system 320 may comprise the commands for pausing decrementer clock 334 of controller unit 310.

During operation of controller unit 310, voltages, currents, and switches are variables which affect controller unit 310. System models 316 may simulate the behavior of the system, functions external to controller unit 310, around controller unit 310. Functions external to controller unit 310 may be switch positions, currents, and/or voltages that are input into controller unit 310. For example, when code 312 is executed on controller unit 310 to change a switch to an "off" position, system models 316 may write to the related memory locations the status that the switch is "off."

Controller unit 310 may comprise code 312 and plurality of processors 324. Plurality of processors 324 may comprise a PowerPC® processor, digital signal processor, and/or a number of other processors. PowerPC® is a registered trademark of IBM. Plurality of processors 324 may have ports 326 for communicating with testing unit 308. Ports 326 may comprise joint test action group port 328, Ethernet port 330, or any other types of port. In different embodiments, other types of ports may be, without limitation, a serial port, a parallel port, and/or a universal serial bus. In one or more embodiments, Ethernet port 330 may be used for communicating with a PowerPC® processor and joint test action group port 328 may be used to communicate with a digital signal processor. Transfer protocol 332 may monitor each port and ensure that each port is transmitting data correctly.

Controller unit 310 may be, for example, without limitation, a common motor starter controller. Controller unit 310 may be another type of controller unit. For example, controller unit 310 may be a controller for the control surfaces of an aircraft, such as ailerons. In different embodiments, controller unit 310 may be in other types of vehicles or platforms, such as a car, spacecraft, submarine, and/or military vehicle. In the different embodiments, controller unit 310 may control different functions, such as, without limitation, the steering systems, propulsion systems, and/or weapon systems.

Figure 4:
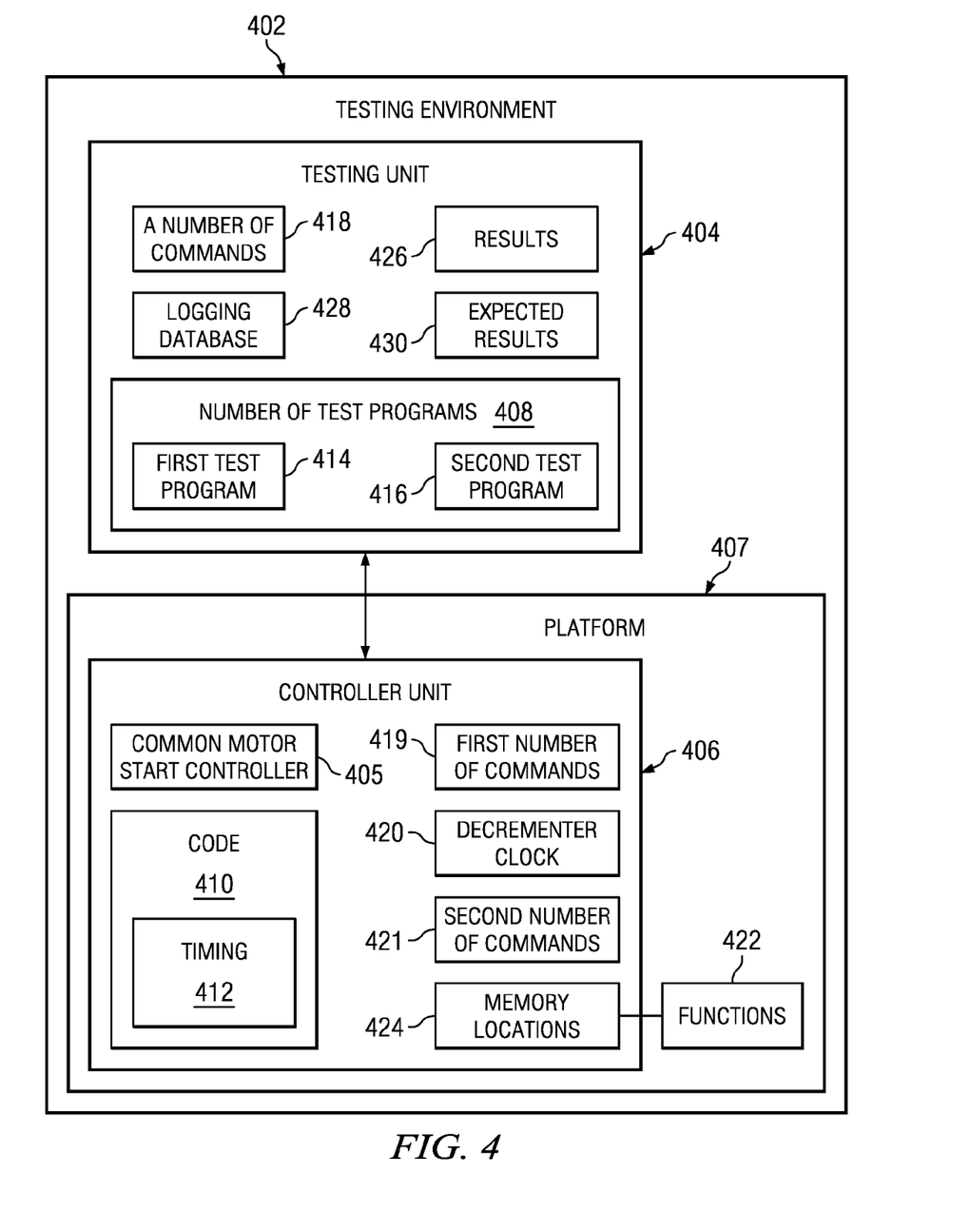
FIG. 4 is an illustration of a block diagram of a testing environment in which an advantageous embodiment may be implemented.

Turning now to FIG. 4, an illustration of a block diagram of a test environment is depicted in accordance with an advantageous embodiment. Test environment 402 may comprise testing unit 404 and controller unit 406. Test environment 402 may be one example of one implementation of test environment 302 of FIG. 3. Controller unit 406 may be, for example, common motor starter controller 405.

Testing unit 404 may be one example of one implementation of testing unit 308 of FIG. 3. Controller unit 406 may be one example of one implementation of controller unit 310 of FIG. 3. Controller unit 406 may be located on platform 407. Platform 407 may be, without limitation, a type of vehicle, aircraft, spacecraft, submarine, and/or military vehicle.

Testing unit 404 may comprise number of test programs 408. The term "number of", as used herein, may mean one or more, such as one or more test programs. Number of test programs 408 may be programs for testing code 410 of controller unit 406. More specifically, number of test programs 408 may test timing 412 of code 410 and/or other parameters of controller unit 406.

Number of test programs 408 may have first test program 414 and second test program 416. Each program may be configured to identify number of commands 418 and send number of commands 418 to controller unit 406.

Number of commands 418 may execute in controller unit 406 between the execution of first number of commands 419 and second number of commands 421. Testing unit 404 may pause second number of commands 421 until number of commands 418 of testing unit 404 have been executed on controller unit 406.

Testing unit 404 may pause second number of commands 421 by pausing decrementer clock 420. Number of commands 418 may comprise commands which read memory locations 424 of controller unit 406. Memory locations 424 may represent whether switches throughout platform 407 are opened or closed.

During execution of number of commands 418 of testing unit 404 on controller unit 406, testing unit 404 may be configured to simulate functions 422 of platform 407 which affects memory locations 424 of controller unit 406.

Functions 422 of platform 407 may be, for example, the operation of a motor. Functions 422 external to controller unit 406 may be switch positions, currents, and/or voltages that are input into controller unit 406.

Memory locations 424 of controller unit 406 may comprise, for example, the information of voltages, currents, and/or switches adjusted for functions 422. For example, a voltage spike may be received from a motor. In response to the voltage spike, first number of commands 419 may flip a switch shutting down power to the motor. Testing unit 404 may be able to simulate the effects of the motor and external components to controller unit 406 using system models.

Testing unit 404 may be configured to receive results 426 of number of commands 418 and log results 426 in logging database 428. Results 426 may be compared to expected results 430. Expected results 430 may be, for example, an indication that a certain switch should be open because of a command executed in first number of commands 419.

Figure 5:
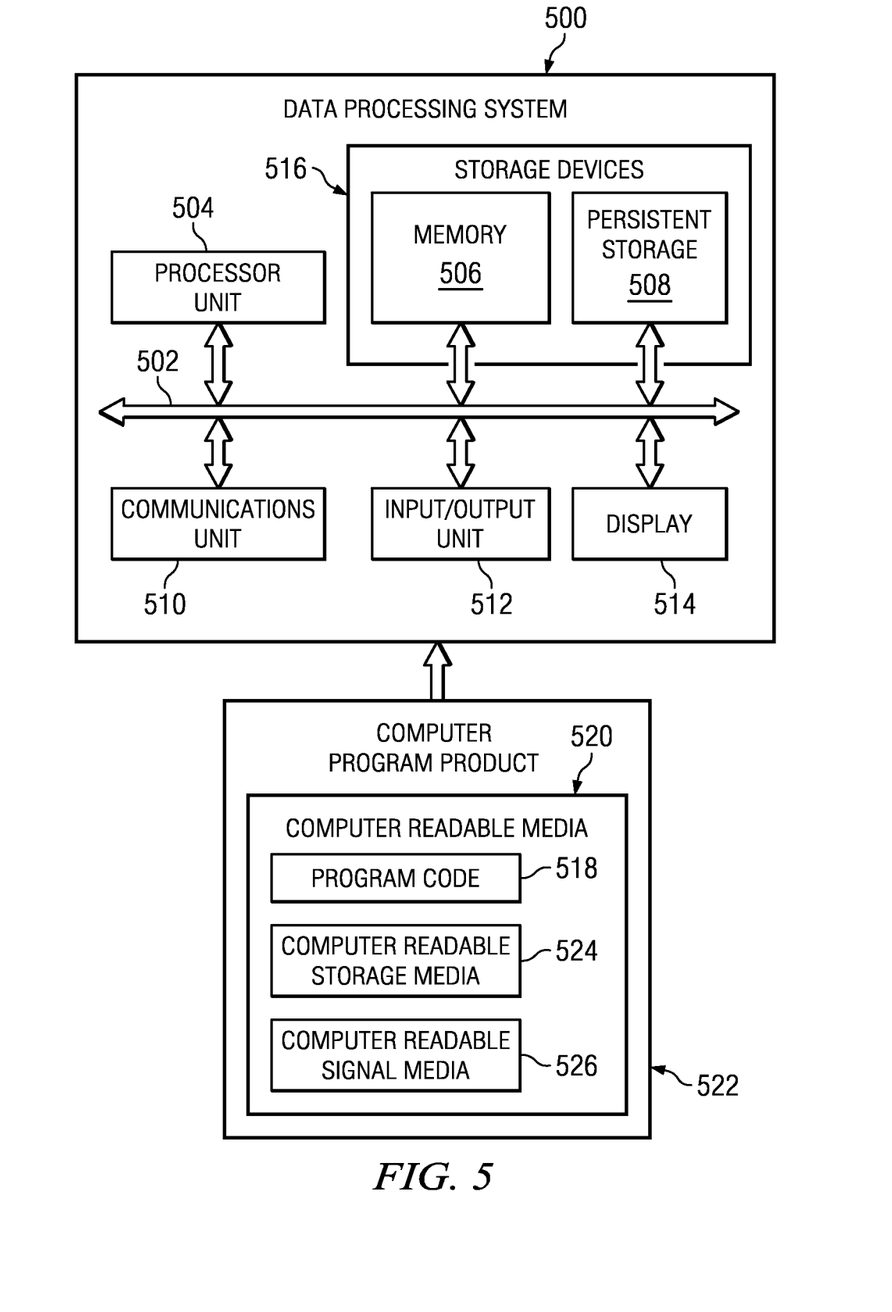
FIG. 5 is an illustration of a data processing system depicted in accordance with an illustrative embodiment.

Turning now to FIG. 5, a diagram of a data processing system is depicted in accordance with an illustrative embodiment. In this illustrative example, data processing system 500 includes communications fabric 502, which provides communications between processor unit 504, memory 506, persistent storage 508, communications unit 510, input/output (I/O) unit 512, and display 514. Data processing system 500 may be one example of one implementation of plurality of processors 324 of FIG. 3. Data processing system 500 may be one example of one implementation of testing unit 308 of FIG. 3.

Processor unit 504 serves to execute instructions for software that may be loaded into memory 506. Processor unit 504 may be a set of one or more processors or may be a multi-processor core, depending on the particular implementation. Further, processor unit 504 may be implemented using one or more heterogeneous processor systems, in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Memory 506, in these examples, may be, for example, a random access memory, or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 may be removable. For example, a removable hard drive may be used for persistent storage 508.

Communications unit 510, in these examples, provides for communication with other data processing systems or devices. In these examples, communications unit 510 is a network interface card. Communications unit 510 may provide communications through the use of either or both physical and wireless communications links.

Input/output unit 512 allows for the input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code, in the different embodiments, may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 may be one example of one implementation of test scripts 306 of FIG. 3.

Program code 518 and computer readable media 520 form computer program product 522. In one example, computer readable media 520 may be computer readable storage media 524 or computer readable signal media 526. Computer readable storage media 524 may include, for example, an optical or magnetic disc that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory that is connected to data processing system 500. In some instances, computer readable storage media 524 may not be removable from data processing system 500.

Alternatively, program code 518 may be transferred to data processing system 500 using computer readable signal media 526. Computer readable signal media 526 may be, for example, a propagated data signal containing program code 518. For example, computer readable signal media 526 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer readable signal media 526 for use within data processing system 500. For instance, program code stored in a computer readable storage media in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of executing program code. As one example, data processing system 500 may include organic components integrated with inorganic components and/or may be comprised entirely of organic components excluding a human being. For example, a storage device may be comprised of an organic semiconductor.

As another example, a storage device in data processing system 500 is any hardware apparatus that may store data. Memory 506, persistent storage 508, and computer readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system.

Additionally, a communications unit may include one or more devices used to transmit and receive data, such as a modem or a network adapter. Further, a memory may be, for example, memory 506 or a cache such as found in an interface and memory controller hub that may be present in communications fabric 502.

Figure 6:
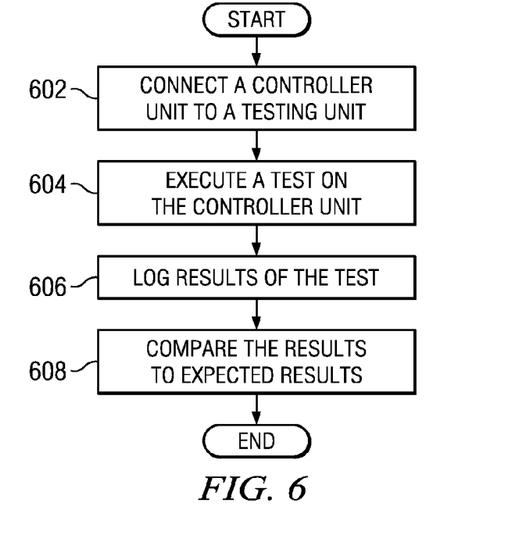
FIG. 6 is an illustration of a flowchart of a process for testing a controller unit in accordance with an advantageous embodiment.

Turning to FIG. 6, a method for testing hardware is depicted in accordance with an illustrative embodiment. The process may operate in an environment such as, for example, test environment 302 of FIG. 3.

The process begins by connecting a controller unit to a testing unit (operation 602). The connection may be made by a number of different connection types, for example, without limitation, an ethernet cable, a serial cable, a joint action testing group connection, a parallel port, or some other type of connection or port that transfers data.

A test is executed on the controller unit (operation 604). The test may be any number of scripts designed to test the timing of the controller unit. In different embodiments, the tests may be used to test other parameters of the controller unit. The testing unit logs the results of the test and/or tests (operation 606). The results may be logged into a database and/or memory.

The results may be compared to expected results (operation 608). The expected results may be responses to the number of commands. The responses may allow the test manager and/or an operator to identify whether the timing of the controller unit is as expected.

Figure 7:
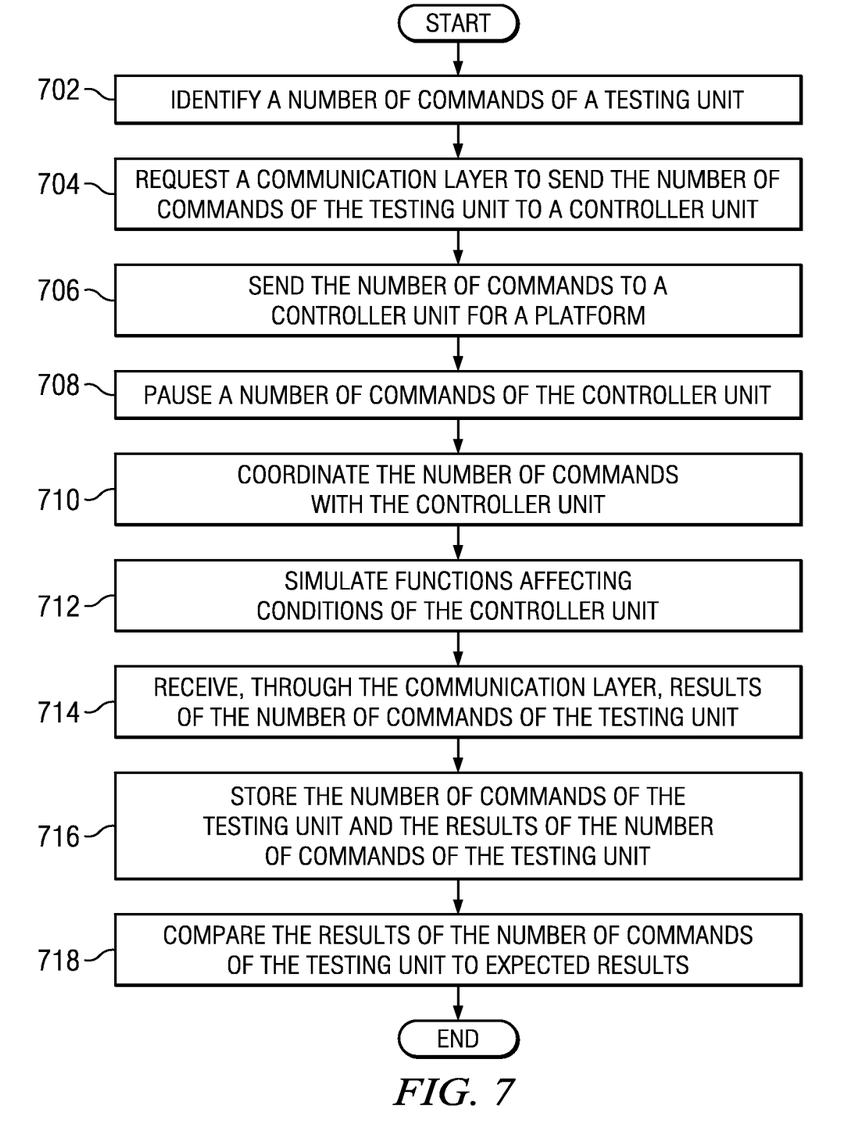
FIG. 7 is an illustration of a flowchart of a process for testing a controller unit in accordance with an advantageous embodiment.

Turning to FIG. 7, a method for testing hardware is depicted in accordance with an illustrative embodiment. The process may operate in an environment such as, for example, test environment 302 of FIG. 3.

The process begins by identifying a number of commands for a testing unit (operation 702). The number of commands may be one example of one implementation of the number of commands 418 from FIG. 4. The number of commands may be subroutines. A test manager executing a test script may identify the number of commands. A communication layer of the testing unit may be requested to send the number of commands to a controller unit for a platform (operation 704). The controller unit may be one example of one implementation of controller unit 310 of FIG. 3. The controller unit may be a common motor starter controller.

The test manager may request a communication layer of the testing unit to send the number of commands to a controller unit for a platform (operation 706). The testing unit may pause a number of commands of the controller unit (operation 708). The testing unit may be remote from the controller unit.

The testing unit may coordinate the number of commands with the controller unit (operation 710). Coordinating the number of commands with the controller unit may further comprise executing the number of commands of the testing unit. The number of commands of the testing unit may be executed while the number of commands of the controller unit are paused.

The number of commands of the controller unit may be paused by pausing the decrementer clock of a processor in the controller unit. The testing unit may simulate functions affecting conditions of the controller unit (operation 712). The functions may be functions that are external to the controller unit.

The testing unit may receive, through the communication layer, results of the number of commands of the testing unit (operation 714). The testing unit may store the number of commands of the testing unit and the results of the number of commands of the testing unit (operation 716). The test manager may compare the results of the number of commands of the testing unit to expected results (operation 718).

Figure 8:
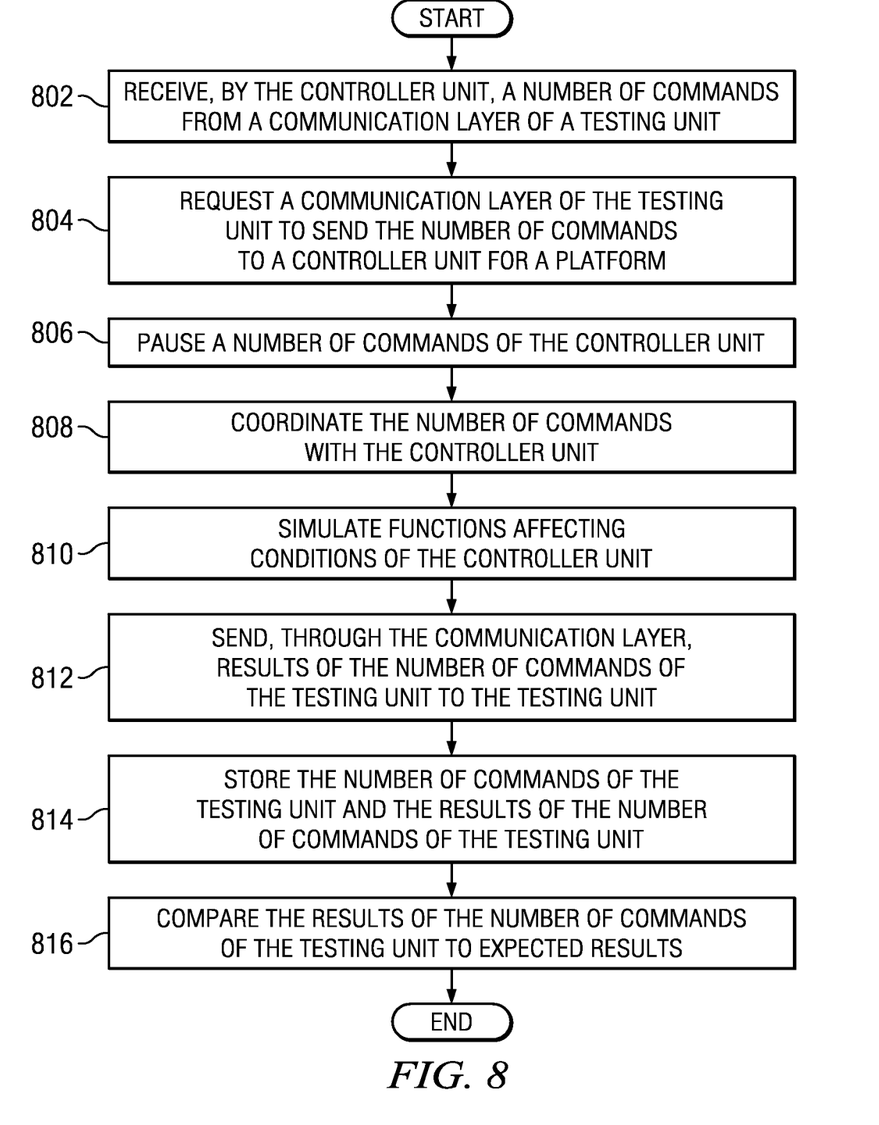
FIG. 8 is an illustration of a flowchart of a process for testing a controller unit in accordance with an advantageous embodiment.

Turning to FIG. 8, a method for testing hardware is depicted in accordance with an illustrative embodiment. The process may operate in an environment such as, for example, test environment 302 of FIG. 3.

The process begins by the controller unit receiving a number of commands from a communication layer of a testing unit (operation 802). The testing unit may be remote from the controller unit. The number of commands may be one example of one implementation of the number of commands 418 from FIG. 4. The number of commands may be subroutines called from a test script. A test manager executing a test script may identify the number of commands.

The test manager may request a communication layer of the testing unit to send the number of commands to a controller unit for a platform (operation 804). The testing unit may pause a number of commands of the controller unit (operation 806). The testing unit may be remote from the controller unit.

The testing unit may coordinate the number of commands with the controller unit (operation 808). Coordinating the number of commands with the controller unit may further comprise executing the number of commands of the testing unit. The number of commands of the testing unit may be executed while the number of commands of the controller unit are paused. The number of commands of the controller unit may be paused by pausing a decrementer clock of a processor in the controller unit. The testing unit may simulate functions affecting conditions of the controller unit (operation 810). The functions may be functions that are external to the controller unit.

The controller unit may send, through the communication layer, results of the number of commands of the testing unit to the testing unit (operation 812). The testing unit may store the number of commands of the testing unit and the results of the number of commands of the testing unit (operation 814). The test manager may compare the results of the number of commands of the testing unit to expected results (operation 816).

Figure 9:
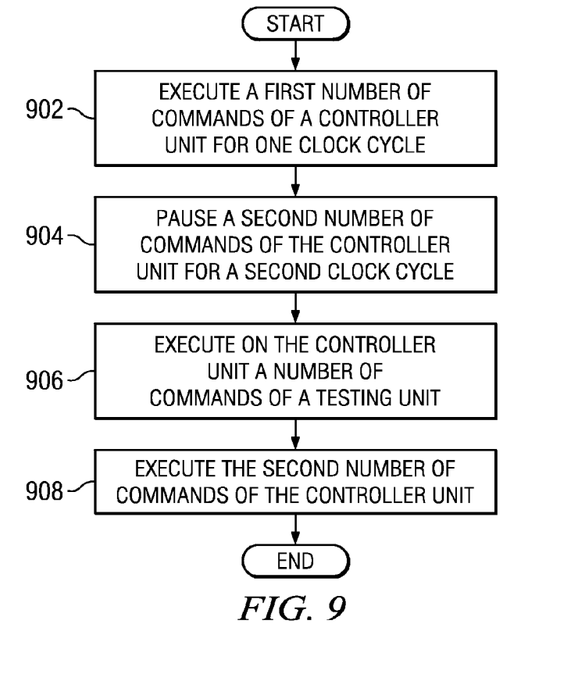
FIG. 9 is an illustration of a flowchart of a process for testing a controller unit in accordance with an advantageous embodiment.

Turning to FIG. 9, a method for testing hardware is depicted in accordance with an illustrative embodiment. The process may operate in an environment such as, for example, test environment 302 of FIG. 3.

The process begins by executing a first number of commands of a controller unit for one clock cycle (operation 902). The first number of commands may be the commands that will be processed on the next clock cycle of the processor.

In different embodiments, the length of time or number of clock cycles which encompasses the first number of commands may be different. For example, the first number of commands may be the commands of the next ten clock cycles or simply the next ten commands regardless of clock cycles. The first number of commands may be the commands executed by the processor during one tick of a decrementer clock of the processor.

The process pauses a second number of commands of the controller unit for a second clock cycle (operation 904). Similar to the first number of commands, the second number of commands may be defined by a number of clock cycles or a set number of commands. The second number of commands may be the commands executed by the processor during one tick of a decrementer clock of the processor. The second number of commands may be stopped for execution while paused. The process executes, on the controller unit, a number of commands of a testing unit (operation 906). The process executes the number of commands of the testing unit in between the first number of commands and the second number of commands. The process executes the second number of commands of the controller unit (operation 908). After the number of commands of the testing unit are executed, the second number of commands may be started back up and executed. The process may repeat itself until the test script is completely executed.

The different advantageous embodiments recognize and take into account a number of considerations. For example, the different advantageous embodiments recognize and take into account that one way to test the timing requirements is modifying the code on the controller and running a designed software pack for that code on the controller. For each test a different code must be run on the controller. Running many tests costs time and money due to changing out the code on the controller for each test. The embedded software is loaded onto the on-chip memory on the board modifying the application that is running on the board.

The different advantageous embodiments provide for an automated test execution. Tests may not be required to be physically loaded on the controller. Commands and results are transmitted between the controller and the testing unit and therefore manual interaction between the testing unit and the controller may not be needed.

Additionally, the different advantageous embodiments provide tests that can be written to measure timing between events in the smallest time resolution of the controller software. For example, if the controller unit executes a processing cycle in 1 millisecond rates, the timing between the events can be measured to the 1 millisecond granularity.

As another example, the different advantageous embodiments recognize and take into account that the embedded software may be tested in a simulated environment. In the simulated environment, no hardware is used. The embedded code is loaded onto a computer, for example, and then tested running on the testing computer and not on the hardware controller unit. However, a problem with the simulation environment approach is that the timing is different than when executed on the controller unit.

The different advantageous embodiments provide testing of the actual controller unit. The different advantageous embodiments may also not be dependent on major modifications to the embedded code on the controller to perform the tests. The preservation of the original software may be allowed and user operation may be reduced. The different advantageous embodiments reduce time and costs by limiting the need for simulation of the controller unit. Simulation may only be needed for peripheral and sub-system behavior. The different advantageous embodiments may also provide a more accurate representation of the embedded code behavior and performance than a simulated environment.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

For example, test scripts 306 and test manager 304 may be part of testing unit 308 of FIG. 3. Also, each processor of plurality of processors 310 may comprise a decrementer clock or just one or some of the processors of plurality of processors 310.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for the purpose of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Although the different advantageous embodiments have been described with respect to parts for aircraft, other advantageous embodiments may be applied to parts for other types of controller systems. For example, without limitation, other advantageous embodiments may be applied to controller systems for spacecraft and/or any type of hardware controller unit.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for testing hardware, the method comprising:
identifying a number of commands for a testing unit;
requesting by a processor a communication layer of the testing unit to send the number of commands to a controller unit for a platform, wherein the testing unit is remote from the controller unit;
coordinating by the processor the number of commands with the controller unit;
pausing a second number of commands of the controller unit, wherein the number of commands of the testing unit are executed while the second number of commands of the controller unit are paused; and
receiving, through the communication layer, results of the number of commands of the testing unit.

2. The method of claim 1, wherein coordinating the number of commands with the controller unit further comprises executing the number of commands of the testing unit.

3. The method of claim 1, wherein pausing the second number of commands of the controller unit further comprises pausing a decrementer clock of a processor.

4. The method of claim 1 further comprising:
comparing the results to expected results.

5. The method of claim 1 further comprising:
storing the number of commands for the testing unit and the results.

6. The method of claim 1 further comprising:
simulating functions affecting conditions of the controller unit, wherein the functions are external to the controller unit.

7. The method of claim 1, wherein the controller unit is a common motor start controller.

8. The method of claim 1, wherein steps in the method of claim 1 comprise a first test program, and wherein a code of the controller unit is kept for a second test program, and wherein the first test program is different from the second test program.

9. The method of claim 1 wherein the results include information related to one of voltage, current, and switch positions.

10. An apparatus comprising:
a bus;
a memory connected to the bus; and
a processor unit connected to the bus, wherein the processor unit configured to identify a number of commands for a testing unit; request a communication layer of the testing unit to send the number of commands to a controller unit for a platform, wherein the testing unit is remote from the controller unit; coordinate the number of commands with the controller unit; pause a second number of commands of the controller unit, wherein the number of commands of the testing unit are executed while the second number of commands of the controller unit are paused; and receive, through the communication layer, results of the number of commands of the testing unit.

11. The apparatus of claim 10, wherein in coordinating the number of commands with the controller unit, the processor unit is further configured to execute the number of commands of the testing unit.

12. The apparatus of claim 11 further comprising a logging database configured to store the results.

13. The apparatus of claim 10, wherein in pausing the second number of commands of the controller unit, the processor unit is further configured to pause a decrementer clock of a processor.

14. The apparatus of claim 10, wherein the processor unit is further configured to compare the results to expected results.

15. The apparatus of claim 10, wherein the processor unit is further configured to store the number of commands for the testing unit and the results.

16. The apparatus of claim 10, wherein the controller unit is a common motor start controller.

17. A computer program product comprising:
a non-transitory computer recordable storage medium;
program code, stored on the computer recordable storage medium, for identifying a number of commands for a testing unit;
program code, stored on the computer recordable storage medium, for requesting a communication layer of the testing unit to send the number of commands to a controller unit for a platform, wherein the testing unit is remote from the controller unit;
program code, stored on the computer recordable storage medium, for coordinating the number of commands with the controller unit;
program code, stored on the computer recordable storage medium, for pausing a number of commands of the controller unit, wherein the number of commands of the testing unit are executed while the number of commands of the controller unit are paused; and
program code, stored on the computer recordable storage medium, for receiving, through the communication layer, results of the number of commands of the testing unit.

18. The computer program product of claim 17, wherein the program code, stored in the computer recordable storage medium, for pausing the second number of commands of the controller unit further comprises:
program code, stored on the computer recordable storage medium, for pausing a decrementer clock of a processor.

19. The computer program product of claim 17, further comprising:
program code, stored on the computer recordable storage medium, for simulating functions affecting conditions of the controller unit, wherein the functions are external to the controller unit.

20. The computer program product of claim 17, further comprising: program code, stored on the computer recordable storage medium, for storing the number of commands for the testing unit and the results.

* * * * *